3,300,476
DEOXYRIBONUCLEASE BLOCKING AGENTS
Rudolf K. Zahn and Richard E. Tiesler, Frankfurt am Main, and Willi W. Hanske, Illertissen, Bavaria, Germany, assignors to Heinrich Mack Nachf, Illertissen, Bavaria, Germany
No Drawing. Filed May 21, 1964, Ser. No. 369,308
Claims priority, application Germany, May 24, 1963, M 56,951
13 Claims. (Cl. 260—211.5)

This application is a continuation-in-part of copending application Serial No. 202,980, filed June 18, 1962, now abandoned.

This invention relates to deoxyribonuclease blocking agents useful for inhibiting the growth development and/or division of cells, especially cancer cells. More particularly, the invention relates to cross-linked deoxyribonucleic acid (DNA) and to the use of such cross-linked compounds in the treatment of tumors.

The invention is based on certain theories and discoveries by applicants starting from known facts in the field of the nucleic acids. It was known, for example, prior to our work, that deoxyribonucleotide-polymerase has the ability to synthetize DNA from the nucleoside-triphosphates of guanine, adenine, thymine and cytosine in the presence of magnesium ions, provided some DNA is present to serve as a primer or starter. The DNA thus synthetized equals the primer even in its base sequence.

Recently with in-vitro tests it has been shown that the polymerase used in the synthesis was not free of deoxyribonuclease (DNase) activities. After removal of the DNase, polymerase activity had vanished.

It has been found that polymerase capacity to synthetize DNA may be fully restored by adding denatured (single stranded) DNA as a primer to the system. Primer may be obtained by heating material DNA to temperatures above a critical one.

It is not likely that there exists a comparable mechanism which is effective in-vivo. In this respect it has been surprising that the DNase can transform native DNA into primer. This has been proven by showing that minute amounts of DNase I will increase synthetic rates in the above mentioned set-up to hitherto unknown levels. In all those tissues, where cellular division rate is high, by applying a suitable technique DNase activity is shown to be augmented. A working hypothesis was used by us linking DNase activity at least partially causatively to DNA synthesis. This is strengthened by the demonstration of the fact that addition of DNase is a suitable concentration enhances cellular division rate. By blocking DNase activity we believe synthetic rate of DNA would decrease and cellular division rate would be inhibited or even stopped. Thus DNase blocking agents should exhibit cytostatic activities.

Yet there could exist a difficulty endangering the existence of the organism in the fact that a minimum level of DNase activity is necessary for life of a normal body cell. But there seems to exist however a different behaviour of cancer and non-cancer cells towards DNase. With tumor cells the DNase-level in which it exists is higher, tumor cells having a higher tolerance against this enzyme and a need for higher activity levels. The tumor cell, therefore, will lose its capacity to divide by lowering the external DNase level below a critical value.

A DNase blocking agent effective against tumor cells without endangering the normal cells of the organism should have its main effects on an extra-cellular basis. Therefore, such DNase blocking agents will be preferred that cannot penetrate cells.

It appeared logical to us to use a substrata-like substance, which would be accepted by and "confound" the enzyme with its typical substrate, without the possibility of being split into the products. The enzyme thus is trapped in an enzyme-substrate-complex.

If the concept of the physiological effect of DNase as being due to the fact of transforming a double-stranded DNA into a single-stranded one is correct, then all means that prevent strand separation will block biological DNase activity. Thus we hypothicated that a cross-linked DNA should turn into a DNase blocking agent, and an anti-tumor agent or cytostatically active material, and this we found to be true.

Cross-linked DNA compounds cross-linked with various types of cross-linking agents are known. The conditions for producing cross-linked DNA compounds are known. However, we have found that cross-linked compounds of lesser toxicity and greater effectiveness are produced by carrying out the reaction of DNA with a cross-linking agent under substantially anhydrous conditions, preferably in nonaqueous liquids which are solvents for the cross-linking agents but not for the DNA or its reaction product, so that the cross-linked DNA can be readily separated from the cross-linking agent which may be toxic.

Furthermore, it is also desirable to react the DNA with a cross-linking agent under substantially anhydrous conditions because the initial reaction product of DNA and cross-likning agent is hydrolytically changed, and we have found that the unhydrolyzed reaction product is the most effective in the treatment of cancer and other tumors.

Furthermore, it is preferable to store the cross-linked DNA in the dry state and dissolve it only shortly before injection or oral administration, for instance in physiological salt solution.

As liquids for use in carrying out the reaction of DNA with cross-linking agents may be mentioned, for instance; hydrocarbons such as petroleum ether, naphtha; chlorohydrocarbon such as carbontetrachloride, ethylene dichloride; ethyl ether; alcohols such as ethanol, and methanol; in short all liquids which do not react with the DNA, nor with the cross-linking agent, nor with the reaction product, and preferably which are solvents for the cross-linking agent.

Any acid which may be produced during the reaction can be neutralized with a base such as, for instance, sodium carbonate.

It is expedient to carry out the reaction at room temperature, increasing the temperature only in the case of slowly progressing reactions and avoiding, as much as possible, an undesirable charge of the DNA which generally takes place at temperatures over 80° C.

In most of our work the DNA has been reacted with cross-linking agents at room temperature (20° C.) for a reaction time of forty-eight hours. Suitably lower temperatures can be used. At below 0° C. the rate of transformation of the DNA to cross-linked DNA is reduced very strongly but takes place slowly. A temperature of approximately 80° C. is generally the upper limit for our reaction, but below 60° C. is safer in order to avoid an undesirable irreversible transformation.

The time of reaction varies with the temperature being of the order of several days at substantially below room temperature. A time of forty-eight hours at room temperature is satisfactory. A time of one to two hours at 20° C.–80° C. gives cross-linked product also having cytostatic effect.

The proportions of the cross-linage agent DNA can be varied widely. After reaction of a cross-linking agent with DNA there is a linking of two guanine residues of two DNA strings. We thus obtain a linking between the $N_7$ items of the two guanine groups. The more of these guanine groups which are linked together the greater is the cytostatic effect. Therefore, preferably there is used a greater amount of cross-linking agent than DNA. Also, since the reaction does not take place instantaneously the cross-linking in a given time is greater and stronger the more cross-linking agent is used.

Thus, while time, temperature and proportions of reactants can be varied widely to obtain cross-linked DNA having at least some cytostatic effect, it can be said that preferably in order to obtain the maximum cytostatic effect the reaction of the cross-linking agent with the DNA is carried out preferably under substantially anhydrous conditions in a nonaqueous liquid vehicle at between approximately 20° C. to 60° C., and preferably with a surplus of the cross-linking agent for such a time until no substantial further cross-linking is obtained.

If cross-linked DNA is produced in an aqueous solution or in a mixture of water and a nonaqueous liquid, with or without buffering agents, the resulting cross-linked DNA is not as effective for cancer inhibition as that produced under anhydrous conditions since it contains at least some hydrolysis products. To avoid further hydrolysis the resulting cross-linked DNA must be separated from the water in any known manner, for instance, by evaporation in a vacuum, freeze drying, or by the addition of a solvent miscible with water, such as alcohol, acetone, or the like.

The cross-linked DNA compounds which have been found to be particularly valuable as anti-cancer agents are those produced by reacting DNA with cross-linking or guanine reactive compounds which are themselves cytostatically active but also are quite toxic. As examples may be mentioned mustard gas, nitrogenous mustard gas.

The toxicity of these alkylating compounds is due to the fact their reactive group reacts not only with the DNA of the cancer cells but also with other biochemically important substances, such as ferments, peptides, and amino acids.

A further advantage of the present invention is therefore that cytostatically active compounds containing by preference two active groups, may be reacted in-vitro with DNA, and only the resulting chemically changed (cross-linked) DNA is then applied on the organism having the cancer cells. In this case the cytostatic effect is largely preserved whereas the toxicity has been decidedly reduced or has disappeared entirely.

Many of the known bifunctional cytostatics, which are suitable as cross-linking agents, contain as effective groups halogen atoms (mustard gas, nitrogenous mustard gas, and various derivatives of nitrogenous mustard gas mostly substituted on the nitrogen atom, such as cyclophosphamide, chlorambucil, alkyl sulfonyloxy groups (for instance busulfan), ethylene amino groups (for instance triethylene melamine).

In addition to these, other cross-linking agents for DNA are known, all of which produce cytostatically active cross-linked DNA compounds. We have also produced new cross-linked DNA compounds. In general a suitable class of compounds for cross-linking DNA are those compounds which contain any polyfunctional group which reacts with any of the nucleotides present in DNA. Ordinarily at least two reactive groups should be present in the compound which would react with at least two nucleotides of the DNA.

The following are some examples of suitable cross-linking agents:

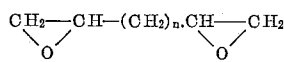

where $n$=zero to infinity, one example being diethylene oxide;

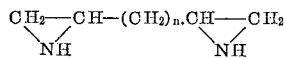

where $n$=zero to infinity, one example being diethylene amine;

$$ONC \cdot (CH_2)_n \cdot CNO$$

where $n$=two to infinity, one example being diethylenecyanate, and another being tetramethylene diisocyanate;

$$ClOC(CH_2)_nCOCl$$

where $n$=zero to infinity, examples being succinic acid dichloride, fumaric dichloride, adipic acid dichloride; and other dicarboxylic acid dichlorides including phthalic acid dichloride;

$$RSO_2O(CH_2)_n \cdot OSO_2R'$$

where $n$=two to infinity and R and R' are alkyl, one example being 1,2-bis-(methylsulfonoxy)-ethane;

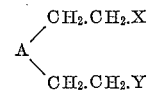

where A=S, NH, N.alkyl, N.aryl, viz., N.phenyl, N.benzyl, and X and Y=Cl, Br, and I, one example being methyl-di($\beta$-chloroethyl) amine or nitrogen mustard, and another being N,N-bis-(2-chloroethyl)-aniline.

In addition to the above cross-linking agents which have been found to react with DNA to give compounds having anti-tumor activity, many other agents have been reacted with DNA and tested; they confirm the general suitability of all cross-linked DNA for tumor inhibiting activity.

(1) When urethane is reacted with aldehydes of the formula RCHO, compounds of the general formula R—CH—(NH.CO.OC$_2$H$_5$)$_2$ will result. In general urethane derivatives of the general formula $$R\text{—}CH\text{—}(NH.CO.OR')_2$$

are suitable, R' and R being a lower alkyl, aralkyl, cycloalkyl, or aryl such as phenyl or benzyl, but there appears no reason why R' and R cannot be any organic radical. These urethane derivatives are difunctional agents suitable for reacting with DNA to produce cross-linked DNA. In this connection ethylidine diurethane $$(CH_3.CH(NH.CO.O.C_2H_5)_2$$

and propylidine diurethane $$CH_3.CH_2.CH(NH.CO.OC_2H_5)_2$$

as well as hexylidine diurethane react with DNA to give an anti-tumor active DNA derivative which is cross-linked DNA. Another suitable cross-linking agent is the reaction product of carbamic methylester with an aldehyde.

(2) Carbonyl compounds resulting by addition of water or esterification or formation of ether bridges of the hydrate form

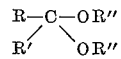

act as bifunctional agents in the invention with the only difference that in this special case the reacting groups OR", OR''', respectively, are attached to one and the same carbon atom. Especially potent in this group are acetaldehyde and the derivative acetaldehydediethylacetal, crotonic aldehyde, diethylacetal, and glyoxylic ethyl ester-diethylacetal.

(3) Also substances derived from phosphonic acid as for example OP(OC$_2$H$_5$)$_3$ and ClOP(C$_2$H$_5$)$_2$ show significantly active reaction products with DNA.

(4) Very active derivatives are found in those products that contains the ethylenimine residue twice, as for instance the well known triethylene melamine (TEM), or compounds of the formula:

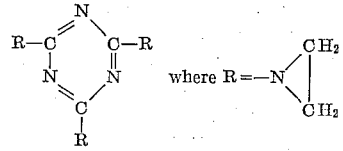

(5) In the group derived from nitrogen mustard, the N,N-bis-(2-chloroethyl) aniline was very potent.

(6) Unexpectedly, ozone after reaction with DNA gave a significantly potent product.

In the above formulae R, R' and R'', unless otherwise indicated, represent alkyl, aralkyl, cycloalkyl, and aryl such as phenyl or benzyl.

(7) Cross-linked DNA may also be produced, as is known, by exposure in known ways to ultraviolet light, X-rays, and other radiation. Such cross-linked DNA to a greater or lesser extent, depending upon conditions of time and intensity of exposure is an anti-tumor inhibitor.

(8) We have also found that the use of a combination of cross-linking agents is suitable, thus any of the above agents can be reacted alone or one after the other to give different types of cross-linked DNA. One example is to react DNA with the chemical cross-linking agents followed by ultraviolet radiation, or vice versa. Another process carried out by us is to react DNA with nitrogen mustard plus ethylidine diurethane.

Performing this cross-linking reaction in aqueous solutions bears the danger of reacting one or several of the reactive groups with water (hydrolysis). The result would be a diminished, eventually only one monofunctional, reaction.

By using inert solvents or by reacting with solid DNA in dry state polyfunctional reactions can be obtained. Any polyfunctional reagent in excess may be removed completely either by dissolving it away in an inert solvent or by pumping off by vacuum. This removal usually is important as these agents are toxic.

EXAMPLE 1

*Preparation of modified DNA by the use of methyl-di($\beta$-chloro-ethyl) amine*

500 mg. of DNA was shaken together with 324 mg. (=1.68 mmol) methyl-di($\beta$-chloro-ethyl) amine hydrochloride dissolved in 330 ml. ethanol (99%) during 30 hours at room temperature. It was filtered and the residue was washed 15 times with 30 ml. ethanol and dried at room temperature in a desiccator, containing $P_2O_5$ and KOH. The dry substance (450 mg.) was shaken for 3 days with 450 ml. 0.15 mol NaCl solution.

Result: 1 mg. cross-linked DNA/ml.

*Testing of the compound produced per Example 1 on the biological object.*—The effect of the DNA nitrogenous mustard gas compound was tested against the Ehrlich-ascites tumor of the mouse. Complete arrest and complete retrogression of the developed tumor could be obtained. All test animals survived without developing another tumor at a later time.

Execution of the test:

15 male mice (NMR 1) were used for every test group.

Test solution: 0.4 mg. DNA nitrogenous mustard gas compound per ml. physiological salt solution.

Solution for the control group: Steril physiological salt solution.

On March 5, 1962, the test groups and control group were inoculated intra-peritoneally with 0.2 ml. Ehrlich-ascites tumor.

Test Group A: 1 ml. test solution (see above) per animal on March 6, March 8, March 10, March 12, intra-peritoneally.

Test Group B: 1 ml. test solution (see above) per animal on March 6, March 8, March 10, March 12, intra-peritoneally.

Test Group C: 1 ml. test solution (see above) per animal on March 8, March 10, March 12, intra-peritoneally.

Control Group: 1 ml. physiological salt solution per animal on March 6, March 8, March 10, March 12, intra-peritoneally.

The weight of all animals was determined every two days.

*Result.*—Without any signs of toxic effects, the tumors of all animals of the test groups were cured. All animals were alive on May 7, 1962, while at that time none of the control animals were alive any more.

A control test proved that the DNA used for the reaction with nitrogenous mustard gas had no effect on the tumor development.

*Toxicity test.*—Two test groups were formed:

Group A: Every mouse (NMR 1) was given 0.27 mg. nitrogenous mustard gas intra-peritoneally.

Group B: Every mouse was given 1 mg. DNA treated with 0.27 mg. nitrogenous mustard gas.

Result:

All animals of group A died within 10 days.

All animals of group B remained alive and showed no physical damage.

EXAMPLE 2

*Preparation of ethylidenediurethane—DNA*

500 mg. of DNA are treated with 512 mg. ethylidenediurethane (2.5 mmol) dissolved in 250 ml. ethanol (99%) and shaken for 40 hours at room temperature. The mixture is drawn off, the residue is washed 15 times with 30 ml. ethanol each and dried at room temperature in vacuo in a desiccator over $P_2O_5$ and KOH. Quantity: 420 mg.

For biological testing, 420 mg. of dried substance are dissolved in 420 ml. of 0.15 m. NaCl solution by shaking for 2 to 3 days at room temperature. Content: 1 mg. modified DNA/ml. Content of phosphorus: $88.3 \cdot 10^{-6}$ g./ml. solution $E_{260m\mu21,11}$.

EXAMPLE 3

*Preparation of acetaldehyde—DNA*

200 mg. of DNA are treated with 44 mg. (=1 mmol) acetaldehyde dissolved in 100 ml. ethanol (99%) and shaken for 40 hours at room temperature. The mixture is drawn off, the residue is washed 15 times with 30 ml. ethanol each and dried at room temperature in vacuo in a desiccator over $P_2O_5$ and KOH. Quantity: 200 mg.

For biological testing, 200 mg. of dried substance are dissolved in 200 ml. of 0.15 m. NaCl solution by shaking for 2 to 3 days at room temperature. Content: 1 mg. modified DNA/ml. Content of phosphorus: $73.2 \cdot 10^{-6}$ g./ml. solution $E_{260m\mu15,31}$.

EXAMPLE 4

*Preparation of triethyl-phosphate—DNA*

200 mg. of DNA are treated with 182 mg. (=1 mmol) triethyl-phosphate dissolved in 100 ml. ethanol (99%) and shaken for 40 hours (at 20° C.). The mixture is drawn off, the residue is washed 15 times with 30 ml. ethanol each and dried at room temperature in vacuo in a desiccator over $P_2O_5$ and KOH. Quantity: 170 mg.

For biological testing, 170 mg. of dried substance are dissolved in 170 ml. of 0.15 m. NaCl solution by shaking for 2 to 3 days at room temperature. Content: 1 mg. modified DNA/ml. Content of phosphorus: $83.5 \cdot 10^{-6}$ g./ml. solution $E_{260m\mu19,21}$.

EXAMPLE 5

*Preparation of triethylene-melamine—DNA*

200 mg. of DNA are treated with 204 mg. (=1mmol) triethylene-malamine dissolved in 100 ml. ethanol (99%) and shaken for 40 hours at 20° C. The mixture is drawn off, the residue is washed 15 times with 30 ml. ethanol each and dried at room temperature in vacuo in a desiccator over $P_2O_5$ and KOH. Quantity: 180 mg.

For biological testing 180 mg. of dried substance are dissolved in 180 ml. of 0.15 m. NaCl solution by shaking for 2 to 3 days at room temperature. Content: 1 mg. modified DNA/ml. Content of phosphorous: $58.3 \cdot 10^{-6}$ g./ml. solution $E_{260\,m\mu\,12,17}$.

EXAMPLE 6

*Preparation of N,N-bis-(2-chlorethyl)-aniline—DNA*

200 mg. DNA are treated with 218 mg. (=1 mmol) N,N-bis-(2-chlorethyl)-aniline dissolved in 100 ml. ethanol (99%) and shaken for 40 hours at 20° C. The mixture is drawn off, the residue washed 15 times with 30 ml. ethanol each and dried in vacuo in a desiccator over $P_2O_5$ and KOH. Quantity: 170 mg.

For biological testing, 170 mg. of dried substance are dissolved in 170 ml. of 0.15 m. NaCl solution by shaking for 2 to 3 days at room temperature. Content: 1 mg. modified DNA/ml. Content of phosphorous: $86.8 \cdot 10^{-6}$ g./ml. solution $E_{260 m\mu}$ 17,68.

EXAMPLE 7

*Preparation of ozone—DNA*

200 mg. of DNA are shaken for 65 hours at 20° C. in a 1 l. shaking cylinder together with an ozone-oxygen mixture containing approximately 60 mg. (=1.25 mmol) $O_3/l/O_2$. The cylinder is evacuated three times and filled each time with argon. Quantity: 200 mg.

For biological testing, 200 mg. of the treated DNA are dissolved in 200 ml. of 0.15 m. NaCl solution, by shaking for 2 to 3 days at room temperature. Content: 1 mg. modified DNA/ml. Content of phosphorus: $79.2 \cdot 10^{-6}$ g./ml. solution $E_{260 m\mu}$ 11,49.

In all the above examples it was found that less hydrolysis and better results in biological tests were obtained by shaking the reacted DNA with aqueous NaCl solution for the minimum time required to bring about solution, such as for example 12 hours instead of 2 or 3 days.

*Other test results.*—Two groups of mice with the same average weight were put together as follows:

(a) Control group with 10 animals.
(b) Test group with 10 animals.

Both groups received on the first day 0.3 ml. Ehrlich-ascites tumor intra-peritoneally.

(a) Received on the 2nd, 4th, 6th and 8th days 1 ml. physiological salt solution per animal.

(b) Received on the 2nd, 4th, 6th and 8th days 1 ml. test solution (1 mg. modified DNA per ml. physiological salt solution) per animal.

The weight of all animals was determined daily.

The following table shows the average weights of the animals of the control and the test groups on the 9th test day.

The weight difference (control group with developed tumor and high weight) is a measure of the retardation of the tumor.

|    | Substances Reacted With DNA | Control Group, g. | Test Group, g. | Weight Difference, g. |
|----|---|---|---|---|
| I  | Ethylidene-diurethane | 33.0 | 27.7 | 5.3 |
| II | Triethyl phosphate | 32.9 | 29.2 | 3.7 |
| III| Acetaldehyde | 32.2 | 26.6 | 5.6 |
| IV | Triethylenemelamine | 31.3 | 28.6 | 2.7 |
| V  | N,N-bis-(2-chlorethyl)-aniline | 32.1 | 28.6 | 3.5 |
| VI | Ozone | 34.0 | 26.5 | 7.5 |

EXAMPLE 8

*Preparation of UV—irradiated DNA*

A solution of trout sperm DNA (3 mg./ml.) is irradiated for 6 min. with a mercury low pressure lamp (type NN 30/89, Quarzlampengesellschaft, Hanau) at a distance of 60 mm. The film thickness of the DNA solution during irradiation was 2.5 mm.

*Action of the UV irradiated DNA on ascites tumor of mice*

Thirty animals that had been previously injected with ascites tumor cells at the second, fourth, sixth and eighth day of the experiment received 1 ml. of the UV irradiated DNA solution intra-peritoneally, the controls receiving the equivalent in physiological saline.

TABLE A

| Day of Experiment | Weight of Animal in grams | | Remarks |
|---|---|---|---|
|  | Controls | Tests |  |
| 2 | 24.8 | 24.5 | Injection. |
| 3 | 24.9 | 24.3 | Do. |
| 4 |  |  | Do. |
| 5 | 26.3 | 24.8 |  |
| 6 |  |  | Do. |
| 8 | 29.2 | 27.2 | Do. |
| 10| 31.8 | 27.0 |  |

Table A gives the weight of tumor bearing mice in grams. It can be seen that in this case a highly significant inhibition of tumor development is occurring in those animals that have received UV irradiated DNA. The significance of difference in weight between the animals that have received UV irradiated DNA or saline could be assured by Students' $t$-test: rejection of O hypothesis at $t=3.69$ at a level of $p=0.001$.

The toxicity of pure nitrogen mustard dissolved in 6.9 physiological saline has also been tested by us on animals. NMRI, mice (male) were treated with the same quantities of nitrogen mustard used in preparing the cross-linked DNA. 0.27 mg. of nitrogen mustard were cross-linked to 1.0 mg. of DNA. This quantity of nitrogen mustard (pure; not reacted) injected caused death of all animals within 10 days, while animals treated with some amount of nitrogen mustard reacted with DNA did not show any damage.

The cytostatic action of cross-linked DNA is, according to our tests and best judgment, as effective as the nitrogen mustards for the same types of tumors in the same effective doses with far less toxicity, and is more effective at, for example, double the normal dose of the nitrogen mustards with at least no greater toxicity than the normal dose.

The maximum dose of nitrogen mustard cross-linked DNA, the most toxic of the cross-linked DNA, tolerated by mice is about 3000 micrograms per gram of body weight (3000 mcg./g.) and a level of 50 mcg./g. completely destroys all tumor cells. Although the long term effect of the compounds of the present invention will not be known for perhaps several years, their proven capability of inhibiting tumors in animals together with their low toxicity strongly indicates their possible value in the therapy of malignant tumors, such as sarcomas, lymphomas, and carminomas in human beings.

While these compounds may be administered orally, treatment of the parenteral route will usually be preferred. The substances may be employed in aqueous solution or dissolved in physiological saline, but various pharmaceutical preparations can be advantageously compounded which contain the active substance along with liquid or solid diluents. Solid preparations for extemporaneous dilution may be formulated employing various buffering agents as well as local anesthetics and other medicinal agents such as antibiotics, hypnotics, analgesics, etc., and inorganic salts to afford desirable pharmacological properties to the composition.

Doses of the order of 100 to 2000 mg./kg. daily of the compounds of the present invention are highly effective in inhibiting tumors in animals. Therefore, the concentration of the active ingredient in the carrier will usually be at least about 0.1%. Since these active substances are stable and widely compatible, they may be administered in solution or suspension in a variety of pharmacologically acceptable vehicles, including water, propylene glycol, diethyl carbonate, glycerol, or oils such as peanut oil or sesame oil.

In addition to the conventional intramuscular, subcutaneous, intraveneous, and intraperitoneal administration routes, these compounds may also be employed in conjunction with perfusion procedures, wherein the tumor site is isolated from the main circulatory system for treatment. Their particular usefulness in this procedure is indicated by their especially high effectiveness against tumor cells in tissue culture.

The effective anticancer agents in the reaction between DNA and substances reactive with a nucleotide of DNA, such as alkylating agents, particularly those called radiomimetic (biologically active) polyfunctional alkylating agents, as well as agents such as ultraviolet radiations and ozone are cross-liked DNA compounds. All cross liked DNA compounds are effective including those shown in the Alexander and Stacy article, "Acta Unio Intern Contra Cancrum," vol. 16, pp. 533–539 (1960) and in the article by Brookes and Lawley in Biochem. J., vol. 80, pp. 496–503 (1961). A diagrammatic representation of DNA cross-linked with a difunctional alkylating agent is shown on page 502. However, we have found that the DNA reaction products produced under anhydrous conditions are more satisfactory as anticancer agents than the hydrolyzed products.

We know of no restriction on the type of reactants to be used for reacting with DNA to produce anticancer substances, other than that they should be reactive with at least one of the nucleotides of DNA, preferably with the guanine moiety. Suitably reactants for DNA, but not restricted thereto, are listed in the Cancer Therapy Report No. 26 of 1963, entitled, "A Survey of Alkylating Agents," and Report No. 9, entitled, "Alkanesulfonic Acid Esters."

We claim:

1. The process of making a deoxyribonuclease blocking agent which comprises contacting under substantially anhydrous conditions deoxyribonucleic acid with a compound having a polyfunctional group reactive with at least one of the nucleotides present in deoxyribonucleic acid under conditions of temperature and time such that a reaction takes place and the deoxyribonucleic acid is cross-linked.

2. The process of claim 1 wherein the compound serving as a cross-linking agent has at least two functional groups reactive with at least two nucleide groups of the deoxyribonucleic acid.

3. The process of claim 1 wherein the reaction is carried out on a solid dry deoxyribonucleic acid.

4. The process of claim 1 wherein the reaction is carried out in an inert solvent.

5. The process of claim 1 wherein the cross-linking compound is a compound having the formula

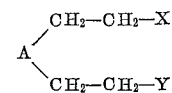

where A is a member selected from the group consisting of S, NH, N·lower alkyl, and X and Y are members selected from the group consisting of Cl, Br, and I.

6. The process of claim 5 wherein the cross-linking compound is methyl di(β-chlorethyl) amine.

7. The process of claim 1 wherein the cross-linking agent is a dicarbonic acid.

8. The proces of claim 1 wherein the cross-linking agent is an aldehyde.

9. The process of claim 1 wherein the cross-linking agent contains a plurality of ethylenimine groups.

10. The process of producing a substantially pure cross linked deoxyribonucleic acid which comprises reacting a deoxyribonucleic acid in substantially anhydrous ethyl alcohol with an alkylating agent and separating the insoluble reaction product so formed from the liquid.

11. In the process of making a deoxyribonuclease blocking agent wherein deoxyribonucleic acid is cross linked by reaction with a guanine reactive compound, the improvement which consists of carrying out the reaction under substantially anhydrous conditions.

12. The process of making a deoxyribonuclease blocking agent substantially free of deleterious hydrolysis products which comprises reacting deoxyribonucleic acid with a guanine reactive compound in a nonaqueous, inert liquid vehicle at between approximately 20° C. to 80° C., to produce a cross linked deoxyribonucleic acid, the reaction being carried out with an excess of guanine reactive compound and separating the cross linked deoxyribonucleic acid from the nonaqueous vehicle.

13. The process of claim 12 wherein the guanine reactive compound is a cystostatically active alkylating agent.

References Cited by the Examiner

UNITED STATES PATENTS

| | | | |
|---|---|---|---|
| 2,917,434 | 12/1959 | Robilliart | 260—211.5 |
| 3,002,965 | 10/1961 | Fox | 260—211.5 |
| 3,010,954 | 11/1961 | Friedman | 260—211.5 |
| 3,051,625 | 8/1962 | Rao | 167—78 |
| 3,085,940 | 4/1963 | Tomcufcik | 167—65 |

OTHER REFERENCES

Lawley: "Chem. Abst." vol. 52, 1958, p. 2973a.
Alexander I: "Chem. Abst.," vol. 54, 1960, p. 22780b.
Alexander II: "Chem. Abst.," vol. 55, 1961, pp. 24862i–24863b.
Alexander III: "Chem. Abst.," vol. 55, 1961, 653 g.

LEWIS GOTTS, *Primary Examiner.*

JULIAN S. LEVITT, *Examiner.*

J. D. GOLDBERG, J. R. BROWN, *Assistant Examiners.*